(12) United States Patent
Teng et al.

(10) Patent No.: US 7,940,882 B2
(45) Date of Patent: May 10, 2011

(54) METHOD FOR SELECTING AND DISPOSING REMAINING SPENT NUCLEAR FUEL BUNDLES FOR CASKS

(75) Inventors: Yung-Hung Teng, Longtan Shiang (TW); Chia-Chi Su, Longtan Shiang (TW)

(73) Assignee: Atomic Energy Council - Institute of Nuclear Energy Research, Taoyuan (TW)

( * ) Notice: Subject to any disclaimer, the term of this patent is extended or adjusted under 35 U.S.C. 154(b) by 0 days.

(21) Appl. No.: 12/068,750

(22) Filed: Feb. 11, 2008

(65) Prior Publication Data

US 2011/0026663 A1  Feb. 3, 2011

(51) Int. Cl.
*G21C 19/00* (2006.01)

(52) U.S. Cl. .................. 376/272; 250/506.1; 250/506.2
(58) Field of Classification Search .................. 376/272; 250/506.1, 506.2
See application file for complete search history.

(56) References Cited

U.S. PATENT DOCUMENTS

| 5,513,232 A | * | 4/1996 | Jones et al. | 376/272 |
| 5,898,747 A | * | 4/1999 | Singh | 376/272 |

* cited by examiner

*Primary Examiner* — Rick Palabrica
(74) *Attorney, Agent, or Firm* — Jackson IPG PLLC; Demian K. Jackson (57) ABSTRACT

There is provided a method for selecting and configuring spent nuclear fuel bundles for casks so that the heat load for each of the casks is about the average heat load for all of the casks. The spent nuclear fuel bundles are disposed in the casks as low as reasonably achievable regarding the heat load.

6 Claims, 11 Drawing Sheets

| No. | Decay heat (W) | No. | Decay heat (W) | No. | Decay heat (W) | No. | Decay heat (W) | No. | Decay heat (W) |
|---|---|---|---|---|---|---|---|---|---|
| 1 | 124.980 | 31 | 126.983 | 61 | 129.145 | 91 | 133.540 | 121 | 138.857 |
| 2 | 124.998 | 32 | 127.004 | 62 | 129.178 | 92 | 133.556 | 122 | 140.030 |
| 3 | 125.015 | 33 | 127.054 | 63 | 129..213 | 93 | 133.560 | 123 | 140.061 |
| 4 | 125.079 | 34 | 127.054 | 64 | 129.241 | 94 | 133.576 | 124 | 140.076 |
| 5 | 125.307 | 35 | 127.363 | 65 | 129.264 | 95 | 133.590 | 125 | 140.154 |
| 6 | 125.314 | 36 | 127.476 | 66 | 129.365 | 96 | 133.600 | 126 | 140.516 |
| 7 | 125.317 | 37 | 127.565 | 67 | 129.365 | 97 | 133.605 | 127 | 140.597 |
| 8 | 125.322 | 38 | 127.600 | 68 | 129.390 | 98 | 133.605 | 128 | 140.644 |
| 9 | 125.332 | 39 | 127.624 | 69 | 129.439 | 99 | 133.620 | 129 | 140.649 |
| 10 | 125.377 | 40 | 127.653 | 70 | 129.473 | 100 | 133.620 | 130 | 140.696 |
| 11 | 125.402 | 41 | 127.731 | 71 | 129.522 | 101 | 134.279 | 131 | 140.904 |
| 12 | 125.422 | 42 | 127.762 | 72 | 129.536 | 102 | 134.334 | 132 | 141.021 |
| 13 | 125.422 | 43 | 127.765 | 73 | 129.727 | 103 | 134.364 | 133 | 141.230 |
| 14 | 125.439 | 44 | 127.785 | 74 | 129.742 | 104 | 134.389 | 134 | 141.235 |
| 15 | 125.514 | 45 | 127.814 | 75 | 129.832 | 105 | 135.208 | 135 | 141.261 |
| 16 | 125.600 | 46 | 127.833 | 76 | 130.267 | 106 | 135.590 | 136 | 141.362 |
| 17 | 126.146 | 47 | 127.843 | 77 | 130.501 | 107 | 135.680 | 137 | 141.967 |
| 18 | 126.585 | 48 | 127.941 | 78 | 130.530 | 108 | 135.720 | 138 | 142.200 |
| 19 | 126.585 | 49 | 127.965 | 79 | 130.696 | 109 | 135.776 | 139 | 142.200 |
| 20 | 126.625 | 50 | 128.043 | 80 | 130.754 | 110 | 136.525 | 140 | 142.299 |
| 21 | 126.630 | 51 | 128.656 | 81 | 130.783 | 111 | 136.600 | 141 | 142.495 |
| 22 | 126.711 | 52 | 128.718 | 82 | 130.847 | 112 | 136.645 | 142 | 142.495 |
| 23 | 126.733 | 53 | 128.755 | 83 | 130.884 | 113 | 136.660 | 143 | 142.501 |
| 24 | 126.778 | 54 | 128.818 | 84 | 131.252 | 114 | 136.987 | 144 | 142.547 |
| 25 | 126.793 | 55 | 128.818 | 85 | 133.249 | 115 | 137.002 | 145 | 142.568 |
| 26 | 126.862 | 56 | 128.902 | 86 | 133.269 | 116 | 137.068 | 146 | 142.760 |
| 27 | 126.893 | 57 | 128.916 | 87 | 133.285 | 117 | 137.143 | 147 | 142.827 |
| 28 | 126.927 | 58 | 128.940 | 88 | 133.285 | 118 | 138.526 | 148 | 142.899 |
| 29 | 126.936 | 59 | 129.002 | 89 | 133.475 | 119 | 138.653 | 149 | 143.248 |
| 30 | 126.978 | 60 | 129.040 | 90 | 133.525 | 120 | 138.755 | 150 | 144.184 |

Fig. 3

| SNF pair | Sum of decay heat | SNF pair | Sum of decay heat | SNF pair | Sum of decay heat |
|---|---|---|---|---|---|
| 1&150 | 269.16 | 26&125 | 267.02 | 51&100 | 262.28 |
| 2&149 | 268.25 | 27&124 | 266.97 | 52&99 | 262.34 |
| 3&148 | 267.91 | 28&123 | 266.99 | 53&98 | 262.36 |
| 4&147 | 267.91 | 29&122 | 266.97 | 54&97 | 262.42 |
| 5&146 | 268.07 | 30&121 | 265.84 | 55&96 | 262.42 |
| 6&145 | 267.88 | 31&120 | 265.74 | 56&95 | 262.49 |
| 7&144 | 267.86 | 32&119 | 265.66 | 57&94 | 262.49 |
| 8&143 | 267.82 | 33&118 | 265.58 | 58&93 | 262.50 |
| 9&142 | 267.83 | 34&117 | 264.20 | 59&92 | 262.56 |
| 10&141 | 267.87 | 35&116 | 264.43 | 60&91 | 262.58 |
| 11&140 | 267.70 | 36&115 | 264.48 | 61&90 | 262.67 |
| 12&139 | 267.62 | 37&114 | 264.55 | 62&89 | 262.65 |
| 13&138 | 267.62 | 38&113 | 264.26 | 63&88 | 262.50 |
| 14&137 | 267.41 | 39&112 | 264.27 | 64&87 | 262.53 |
| 15&136 | 266.88 | 40&111 | 264.25 | 65&86 | 262.53 |
| 16&135 | 266.86 | 41&110 | 264.26 | 66&85 | 262.61 |
| 17&134 | 267.38 | 42&109 | 263.54 | 67&84 | 260.62 |
| 18&133 | 267.82 | 43&108 | 263.49 | 68&83 | 260.27 |
| 19&132 | 267.61 | 44&107 | 263.47 | 69&82 | 260.29 |
| 20&131 | 267.33 | 45&106 | 263.40 | 70&81 | 260.26 |
| 21&130 | 267.36 | 46&105 | 263.04 | 71&80 | 260.28 |
| 22&129 | 267.38 | 47&104 | 262.23 | 72&79 | 260.23 |
| 23&128 | 267.38 | 48&103 | 262.31 | 73&78 | 260.26 |
| 24&127 | 267.31 | 49&102 | 262.30 | 74&77 | 260.24 |
| 25&126 | 267.02 | 50&101 | 262.32 | 75&76 | 260.10 |

Fig. 4

| SNF pair | mean | SNF pair | mean | SNF pair | mean |
|---|---|---|---|---|---|
| 75&76 | 130.050 | 60&91 | 131.290 | 28&123 | 133.494 |
| 72&79 | 130.116 | 66&85 | 131.307 | 26&125 | 133.508 |
| 74&77 | 130.122 | 62&89 | 131.327 | 25&126 | 133.655 |
| 70&81 | 130.128 | 61&90 | 131.335 | 21&130 | 133.663 |
| 73&78 | 130.129 | 46&105 | 131.521 | 22&129 | 133.680 |
| 68&83 | 130.137 | 45&106 | 131.702 | 24&127 | 133.688 |
| 71&80 | 130.138 | 44&107 | 131.733 | 23&128 | 133.689 |
| 69&82 | 130.143 | 43&108 | 131.743 | 17&134 | 133.691 |
| 67&84 | 130.309 | 42&109 | 131.769 | 14&137 | 133.703 |
| 47&104 | 131.116 | 34&117 | 132.099 | 20&131 | 133.765 |
| 51&100 | 131.138 | 40&111 | 132.127 | 19&132 | 133.803 |
| 49&102 | 131.150 | 41&110 | 132.128 | 12&139 | 133.811 |
| 48&103 | 131.153 | 38&113 | 132.130 | 13&138 | 133.811 |
| 50&101 | 131.161 | 39&112 | 132.135 | 11&140 | 133.851 |
| 52&99 | 131.169 | 35&116 | 132.216 | 18&133 | 133.908 |
| 53&98 | 131.180 | 36&115 | 132.239 | 8&143 | 133.912 |
| 55&96 | 131.209 | 37&114 | 132.276 | 9&142 | 133.914 |
| 54&97 | 131.212 | 33&118 | 132.790 | 7&144 | 133.932 |
| 56&95 | 131.246 | 32&119 | 132.829 | 10&141 | 133.936 |
| 57&94 | 131.246 | 31&120 | 132.869 | 6&145 | 133.941 |
| 63&88 | 131.249 | 30&121 | 132.918 | 4&147 | 133.953 |
| 58&93 | 131.250 | 16&135 | 133.431 | 3&148 | 133.957 |
| 64&87 | 131.263 | 15&136 | 133.438 | 5&146 | 134.034 |
| 65&86 | 131.267 | 29&122 | 133.483 | 2&149 | 134.123 |
| 59&92 | 131.279 | 27&124 | 133.485 | 1&150 | 134.582 |

Fig. 5

| SNF pair | difference Value | SNF pair | difference Value | SNF pair | difference Value |
| --- | --- | --- | --- | --- | --- |
| 75&76 | -2.2555 | 60&91 | -1.015 | 28&123 | 1.189 |
| 72&79 | -2.189 | 66&85 | -0.998 | 26&125 | 1.203 |
| 74&77 | -2.1835 | 62&89 | -0.9785 | 25&126 | 1.3495 |
| 70&81 | -2.177 | 61&90 | -0.97 | 21&130 | 1.358 |
| 73&78 | -2.1765 | 46&105 | -0.7845 | 22&129 | 1.375 |
| 68&83 | -2.168 | 45&106 | -0.603 | 24&127 | 1.3825 |
| 71&80 | -2.167 | 44&107 | -0.5725 | 23&128 | 1.3835 |
| 69&82 | -2.162 | 43&108 | -0.5625 | 17&134 | 1.3855 |
| 67&84 | -1.9965 | 42&109 | -0.536 | 14&137 | 1.398 |
| 47&104 | -1.189 | 34&117 | -0.2065 | 20&131 | 1.4595 |
| 51&100 | -1.167 | 40&111 | -0.1785 | 19&132 | 1.498 |
| 49&102 | -1.1555 | 41&110 | -0.177 | 12&139 | 1.506 |
| 48&103 | -1.1525 | 38&113 | -0.175 | 13&138 | 1.506 |
| 50&101 | -1.144 | 39&112 | -0.1705 | 11&140 | 1.5455 |
| 52&99 | -1.136 | 35&116 | -0.0895 | 18&133 | 1.6025 |
| 53&98 | -1.125 | 36&115 | -0.066 | 8&143 | 1.6065 |
| 55&96 | -1.096 | 37&114 | -0.029 | 9&142 | 1.6085 |
| 54&97 | -1.0935 | 33&118 | 0.485 | 7&144 | 1.627 |
| 56&95 | -1.059 | 32&119 | 0.5235 | 10&141 | 1.631 |
| 57&94 | -1.059 | 31&120 | 0.564 | 6&145 | 1.636 |
| 63&88 | -1.056 | 30&121 | 0.6125 | 4&147 | 1.648 |
| 58&93 | -1.055 | 16&135 | 1.1255 | 3&148 | 1.652 |
| 64&87 | -1.042 | 15&136 | 1.133 | 5&146 | 1.7285 |
| 65&86 | -1.0385 | 29&122 | 1.178 | 2&149 | 1.818 |
| 59&92 | -1.026 | 27&124 | 1.1795 | 1&150 | 2.277 |

Fig. 6

| SNF pair | difference Value | SNF pair | difference Value | SNF pair | difference Value |
|---|---|---|---|---|---|
| 65&86 | -1.0385 | 42&109 | -0.536 | 32&119 | 0.5235 |
| 59&92 | -1.026 | 34&117 | -0.2065 | 31&120 | 0.564 |
| 60&91 | -1.015 | 40&111 | -0.1785 | 30&121 | 0.6125 |
| 66&85 | -0.998 | 41&110 | -0.177 | 16&135 | 1.1255 |
| 62&89 | -0.9785 | 38&113 | -0.175 | 29&122 | 1.178 |
| 61&90 | -0.97 | 39&112 | -0.1705 | 27&124 | 1.1795 |
| 46&105 | -0.7845 | 35&116 | -0.0895 | 20&131 | 1.4595 |
| 45&106 | -0.603 | 36&115 | -0.066 | 19&132 | 1.498 |
| 44&107 | -0.5725 | 33&118 | 0.485 | 12&139 | 1.506 |
| 43&108 | -0.5625 | | | Sum of the difference Value | -0.016 |

Fig. 7

| SNF pair | difference Value | SNF pair | difference Value | SNF pair | difference Value |
|---|---|---|---|---|---|
| 69&82 | -2.162 | 54&97 | -1.0935 | 24&127 | 1.3825 |
| 67&84 | -1.9965 | 56&95 | -1.059 | 23&128 | 1.3835 |
| 47&104 | -1.189 | 57&94 | -1.059 | 17&134 | 1.3855 |
| 51&100 | -1.167 | 63&88 | -1.056 | 14&137 | 1.398 |
| 49&102 | -1.1555 | 58&93 | -1.055 | 13&138 | 1.506 |
| 48&103 | -1.1525 | 15&136 | 1.133 | 11&140 | 1.5455 |
| 50&101 | -1.144 | 25&126 | 1.3495 | 18&133 | 1.6025 |
| 52&99 | -1.136 | 21&130 | 1.358 | 8&143 | 1.6065 |
| 53&98 | -1.125 | 22&129 | 1.375 | 9&142 | 1.6085 |
| 55&96 | -1.096 | | Sum of the difference Value | | -0.012 |

Fig. 8

| No. | Decay heat (W) | No. | Decay heat (W) | No. | Decay heat (W) |
|---|---|---|---|---|---|
| 139 | 142.200 | 107 | 135.680 | 42 | 127.762 |
| 135 | 141.261 | 106 | 135.590 | 41 | 127.731 |
| 132 | 141.021 | 105 | 135.208 | 40 | 127.653 |
| 131 | 140.904 | 92 | 133.556 | 39 | 127.624 |
| 124 | 140.076 | 91 | 133.540 | 38 | 127.600 |
| 122 | 140.030 | 90 | 133.525 | 36 | 127.476 |
| 121 | 138.857 | 89 | 133.475 | 35 | 127.363 |
| 120 | 138.755 | 86 | 133.269 | 33 | 127.054 |
| 119 | 138.653 | 85 | 133.249 | 34 | 127.054 |
| 118 | 138.526 | 66 | 129.365 | 32 | 127.001 |
| 117 | 137.143 | 65 | 129.264 | 31 | 126.983 |
| 116 | 137.168 | 62 | 129.178 | 30 | 126.978 |
| 115 | 137.002 | 61 | 129.145 | 29 | 126.936 |
| 113 | 136.660 | 60 | 129.040 | 27 | 126.893 |
| 112 | 136.645 | 59 | 129.002 | 20 | 126.625 |
| 111 | 136.600 | 46 | 127.833 | 19 | 126.585 |
| 110 | 136.525 | 45 | 127.814 | 16 | 125.600 |
| 109 | 135.776 | 44 | 127.785 | 12 | 125.422 |
| 108 | 135.720 | 43 | 127.765 | | |

Fig. 9

| | | | | | | | | | |
|---|---|---|---|---|---|---|---|---|---|
| | | | | [20] 126.6 | [29] 126.9 | | | | |
| | | [42] 127.8 | [16] 125.6 | [85] 133.2 | [65] 129.3 | [46] 127.8 | [43] 127.8 | | |
| | [35] 127.4 | [59] 129.0 | [107] 135.7 | [111] 136.6 | [115] 137.0 | [105] 135.2 | [62] 129.2 | [32] 127.0 | |
| | [36] 127.5 | [89] 133.5 | [118] 138.5 | [121] 138.9 | [122] 140.0 | [117] 137.1 | [92] 133.6 | [39] 127.6 | |
| | [31] 127.0 | [110] 136.5 | [131] 140.9 | [139] 142.2 | [135] 141.3 | [132] 141.0 | [109] 135.8 | [30] 127.0 | |
| | [38] 127.6 | [91] 133.5 | [116] 137.1 | [124] 140.1 | [120] 138.8 | [119] 138.7 | [90] 133.5 | [40] 127.7 | |
| | [33] 127.0 | [60] 129.0 | [108] 135.7 | [113] 136.7 | [112] 136.6 | [106] 135.6 | [61] 129.1 | [34] 127.0 | |
| | [44] 127.8 | [45] 127.8 | [66] 129.4 | [86] 133.3 | [12] 125.4 | [41] 127.7 | | | |
| | | | [27] 126.9 | [19] 126.6 | | | | | |

METHOD FOR SELECTING AND DISPOSING REMAINING SPENT NUCLEAR FUEL BUNDLES FOR CASKS

BACKGROUND OF INVENTION

1. Field of Invention

The present invention relates to a method for selecting and configuring spent nuclear fuel bundles for casks so that the heat load for each of the casks is about the average heat load for all of the casks.

2. Related Prior Art

Spent nuclear fuel bundles are disposed in casks. There has not been any method for selecting and configuring the spent nuclear fuel bundles for the casks.

The present invention is therefore intended to obviate or at least alleviate the problems encountered in prior art.

SUMMARY OF INVENTION

It is the primary objective of the present invention to provide a method for selecting and configuring spent nuclear fuel bundles for casks so that the heat load for each of the casks is about the average heat load for all of the casks.

In the method according to the present invention, the spent nuclear fuel bundles are arranged in order based on their values of decay heat so that the spent nuclear fuel bundles with lower values of decay heat are given smaller numbers. Any spent nuclear fuel bundles with values of decay heat higher than a limit of decay heat for the casks are removed. The mean value of decay heat of the remaining all spent nuclear fuel bundles is calculated. It is determined if the number of cells of each cask is odd or even. It is determined if the number of the remaining spent nuclear fuel bundles is odd or even. If the number of the cells of each cask is odd or even, and if the number of the remaining spent nuclear fuel bundles is even, the remaining spent nuclear fuel bundles are matched. The spent nuclear fuel bundle with the highest value of decay heat is matched with the spent nuclear fuel bundle with the lowest value decay heat. The spent nuclear fuel bundle with the second highest value of decay heat is matched with the spent nuclear fuel bundle with the second lowest value of decay heat. The spent nuclear fuel bundle with the third highest value of decay heat is matched with the spent nuclear fuel bundle with the third lowest value of decay heat, and so on. The mean value of decay heat of each spent nuclear fuel bundle pair is calculated. The spent nuclear fuel bundle pairs are arranged in order based on their mean values of decay heat. The difference between the mean value of decay heat of each spent nuclear fuel bundle pair and the mean value of decay heat of all spent nuclear fuel bundles is calculated. It is determined if the number of the cells of each cask is odd or even. A first or second way is selected to dispose the remaining spent nuclear fuel bundles in the casks. It is determined if the heat load on each cask is smaller than a limit of heat load. If the heat load on each cask is not smaller than the limit of heat load, the limit of decay heat is reduced and the process is returned to the step of removing any spent nuclear fuel bundles with values of decay heat higher than a limit of decay heat for the casks.

Other objectives, advantages and features of the present invention will become apparent from the following description referring to the attached drawings.

BRIEF DESCRIPTION OF DRAWINGS

The present invention will be described via the detailed illustration of the preferred embodiment referring to the drawings.

FIG. 3 is a table of the spent nuclear fuel bundles numbered in order based on the decay heat.

DETAILED DESCRIPTION OF PREFERRED EMBODIMENT

There is provided a method for selecting and configuring spent nuclear fuel bundles for casks according to the preferred embodiment of the present invention. The method includes a subroutine for selecting the spent nuclear fuel bundles for the casks referring to FIG. 1 and another subroutine for configuring the spent nuclear fuel bundles for the casks referring to FIG. 2. The number of the casks is N1. Each cask includes a number of cells. The number of the cells of each cask is N2. The number of the spent nuclear fuel bundles is N3.

Figure 1:
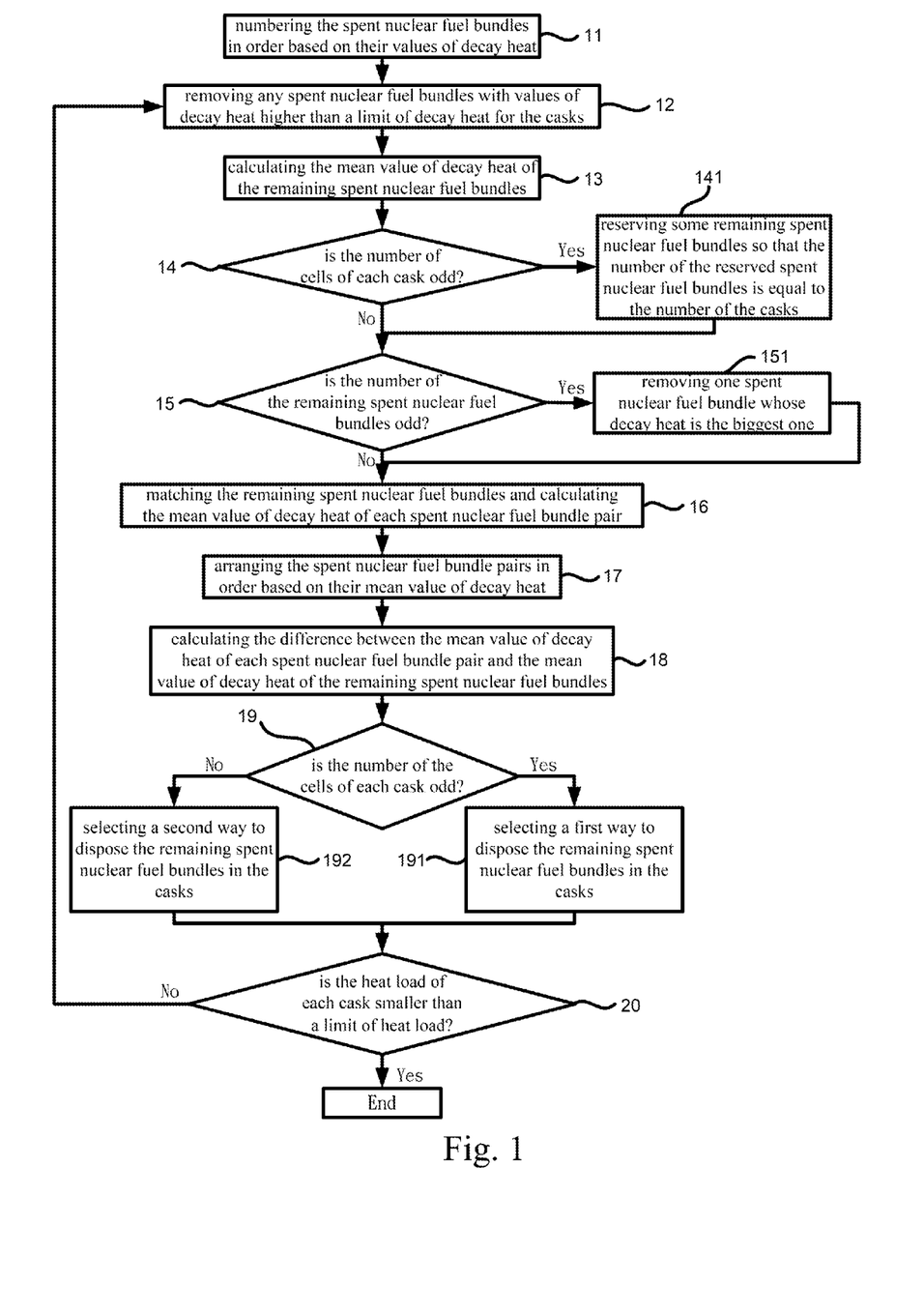
FIG. 1 is a flowchart of a process for selecting spent nuclear fuel bundles for casks according to the preferred embodiment of the present invention.

At 11, the spent nuclear fuel bundles are numbered in order based on their values of decay heat. The spent nuclear fuel bundles with lower values of decay heat are given smaller numbers.

At 12, any spent nuclear fuel bundles with values of decay heat higher than a limit of decay heat for the casks are removed. The number of the remaining spent nuclear fuel bundles is N4. N4 is equal to N3 if no spent nuclear fuel bundle is removed. The limit of decay heat is determined during the design of the casks.

At 13, the mean value of decay heat of the remaining all spent nuclear fuel bundles is calculated.

At 14, it is determined if N2 is odd. The process goes to 141 if N2 is odd, and goes to 15 if otherwise. No spent nuclear fuel bundle is reserved if N2 is even so that the number of the non-reserved spent nuclear fuel bundles, N5, is equal to N4.

At 141, some of the spent nuclear fuel bundles with values of decay heat closest to the mean value of decay heat of the spent nuclear fuel bundles are reserved for the casks. The number of the reserved spent nuclear fuel bundles is equal to N2. The number of the non-reserved spent nuclear fuel bundles, N5, is equal to N4 minus N2. Then, the process goes to 15.

At 15, it is determined if N5 is odd. The process goes to 151 if N5 is odd. Otherwise, the process goes to 16. An even number, N6, is calculated before the process goes to 16. N6 is equal to N5 if N5 is even.

At 151, the spent nuclear fuel bundle with the highest value of decay heat is removed from the non-reserved spent nuclear fuel bundles so that N6 is equal to N5 minus 1.

At 16, the N6 spent nuclear fuel bundles are matched, thus providing a number of spent nuclear fuel bundle pairs, N7. N7 is equal to N6 divided by 2. The N6 spent nuclear fuel bundles are arranged in order based on their values of decay heat. The spent nuclear fuel bundle with the highest value of decay heat is matched with the spent nuclear fuel bundle with the lowest value decay heat. The spent nuclear fuel bundle with the second highest value of decay heat is matched with the spent nuclear fuel bundle with the second lowest value of decay heat. The spent nuclear fuel bundle with the third highest value of decay heat is matched with the spent nuclear fuel bundle with the third lowest value of decay heat. Similarly, the N6 spent nuclear fuel bundles is matched, thus providing the N7 spent nuclear fuel bundle pairs. The sum of decay heat of each spent nuclear fuel bundle pair is calculated.

At 17, the sum of decay heat of each spent nuclear fuel bundle pair is divided by 2, thus providing the mean value of decay heat of each spent nuclear fuel bundle pair. The N7 spent nuclear fuel bundle pairs are arranged in order based on their mean values of decay heat.

At 18, the mean value of all spent nuclear fuel bundles is subtracted from the mean value of decay heat of each spent nuclear fuel bundle pair, thus providing the difference between the mean value of decay heat of each spent nuclear fuel bundle pair and the mean value of decay heat of all spent nuclear fuel bundles.

At 19, it is determined if N2 is odd. The process goes to 191 if N2 is odd, and goes to 192 if otherwise. Either way, a number, N8, of spent nuclear fuel bundle pairs are selected for each cask.

At 191, N8 is equal to N2 minus 1 and then divided by 2. Each reserved spent fuel bundle is reserved for a related cask. The difference between the value of decay heat of each reserved spent nuclear bundle and the mean value of decay heat of all spent nuclear fuel bundles is calculated. N8 spent nuclear fuel bundle pairs are selected for each cask so that the total of the difference between the mean value of decay heat of each selected spent nuclear fuel bundle pair and the mean value of decay heat of all spent nuclear fuel bundles plus the difference between the value of decay heat of the only reserved spent nuclear fuel bundle and the mean value of decay heat of all spent nuclear fuel bundles is close to zero.

At 192, N8 is equal to N2 divided by 2. N8 spent nuclear fuel bundle pairs are selected for each cask so that the total of the difference between the mean value of decay heat of each selected spent nuclear fuel bundle pair and the mean value of decay heat of all spent nuclear fuel bundles is close to zero.

At 20, it is determined if the heat load on each cask is smaller than a limit of heat load. The process goes to 21 if so, and returns to 12 if otherwise. Should the process return to 12, the limit of decay heat would be reduced.

Figure 2:
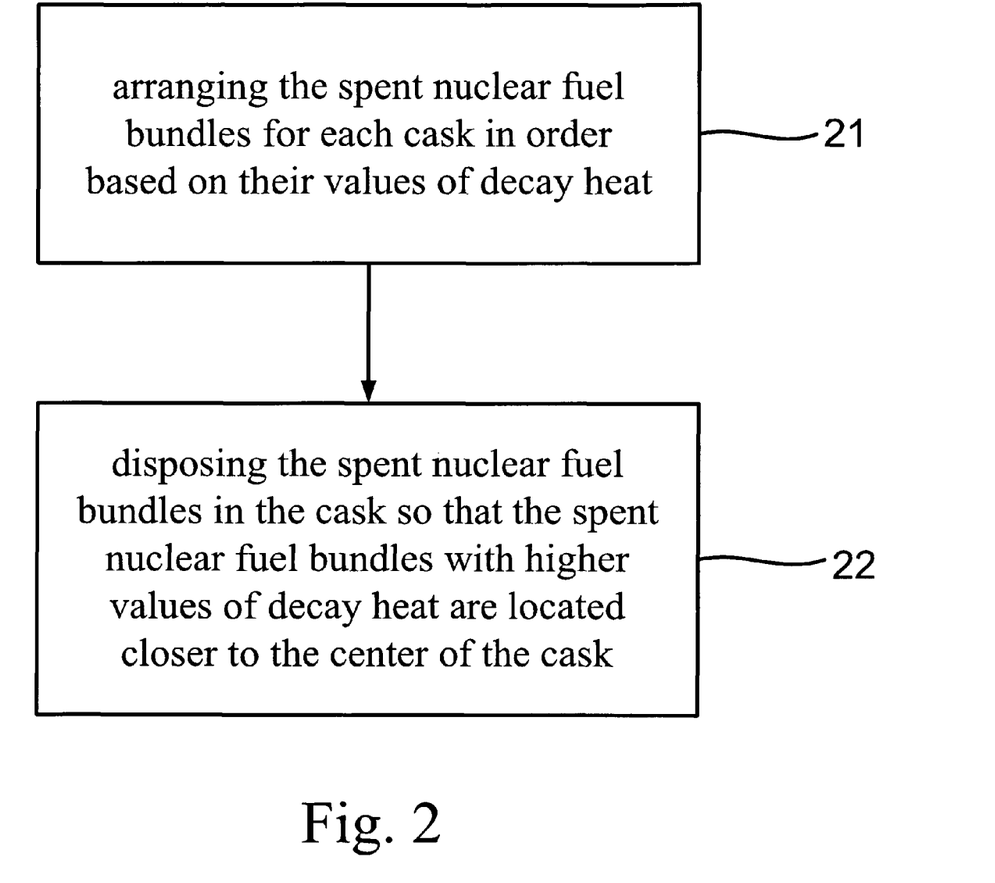
FIG. 2 is a flowchart of a process for configuring the spent nuclear fuel bundles for the casks according to the preferred embodiment of the present invention.

At 21, for each cask, there are N9 spent nuclear fuel bundles wherein N9 is equal to N8 multiplied by 2. The N9 spent nuclear fuel bundles are arranged in order based on their values of decay heat.

At 22, the N9 spent nuclear fuel bundles are disposed in the cask so that the spent nuclear fuel bundles with higher values of decay heat are located closer to the center of the cask. The value of decay heat of each spent nuclear fuel bundle is closest to the value of decay heat of another spent nuclear fuel bundle at a same distance to the center of the cask in a diagonal line. The sum of decay heat of the spent nuclear fuel bundles in each quadrant is close to the sum of decay heat of the spent nuclear fuel bundles in any other quadrant.

Referring to FIGS. 3 through 11, there is shown a working environment for the execution of the method. There are 2 casks, i.e., N1 is 2. Each cask includes 56 cells, i.e., N2 is 56. There are 150 spent nuclear fuel bundles, i.e., N3 is 150. The limit of heat load on each cask is 13 kilowatts. The limit of the decay heat is 232.14 watts.

Referring to FIG. 3, there is shown a table of 150 spent nuclear fuel bundles numbered in order based on the decay heat. This table is provided at 11.

Figure 4:
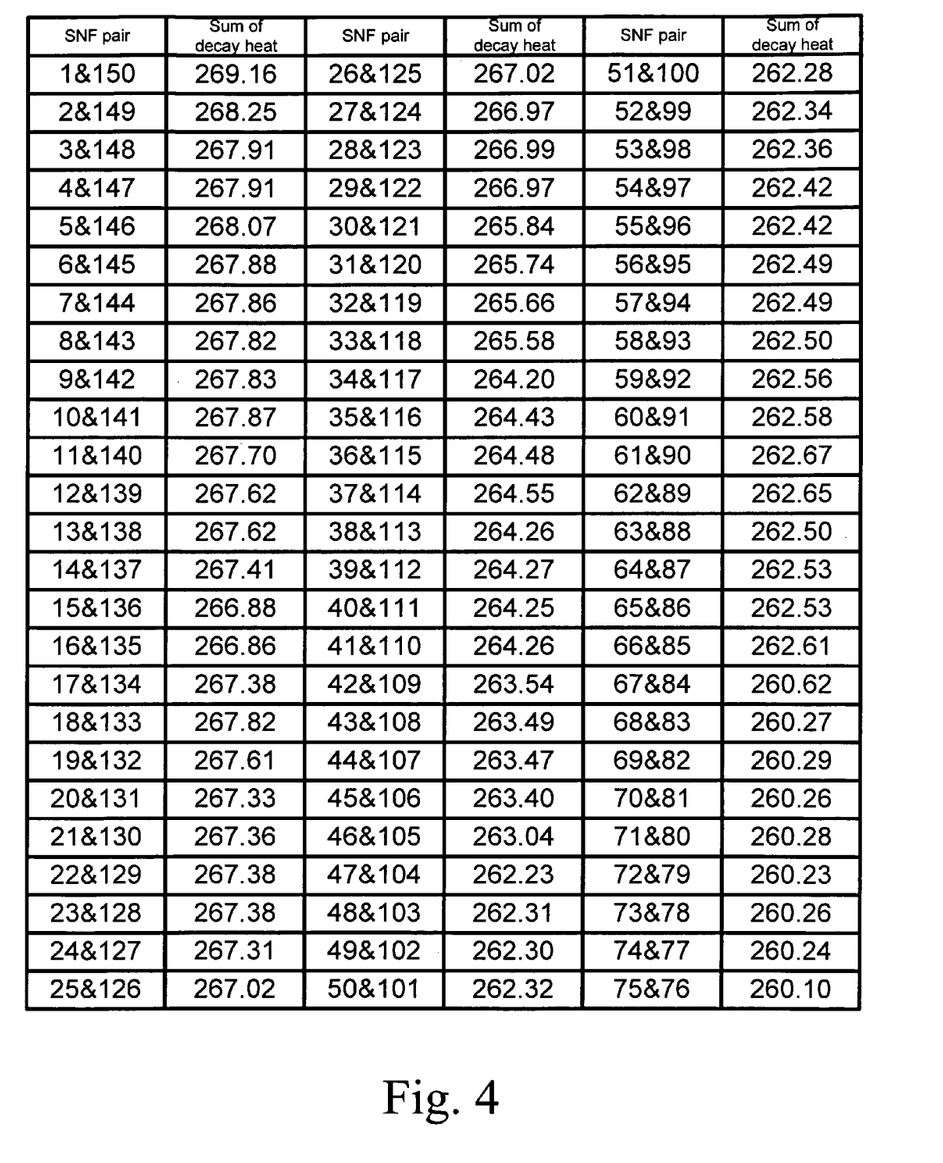
FIGS. 4 through 6 are tables of spent nuclear fuel bundle pairs.

Referring to FIG. 4, there is shown a table of 75 spent nuclear fuel bundle pairs. This table is provided at 16.

Figure 5:
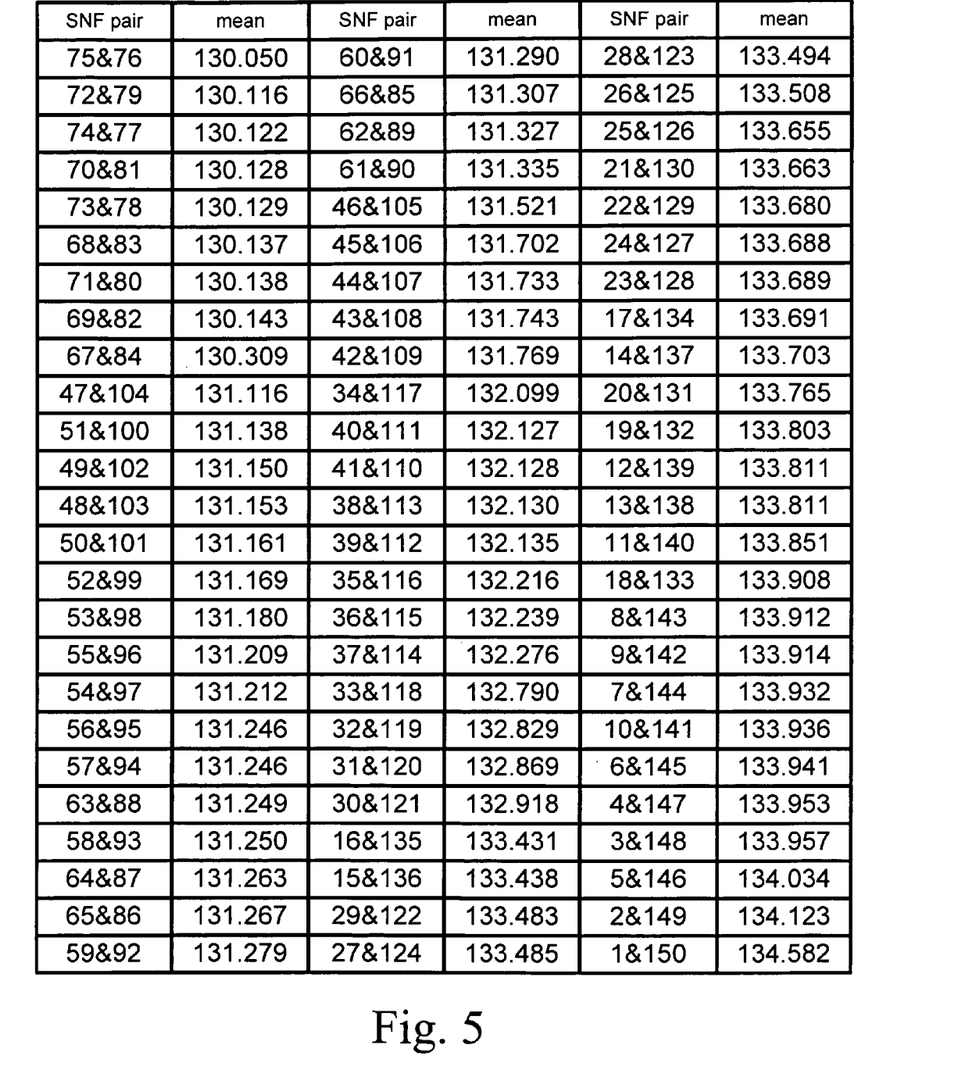

Referring to FIG. 5, there is shown another table of the 75 spent nuclear fuel bundle pairs arranged in order based on their mean values of decay heat. This table is provided at 17.

Figure 6:
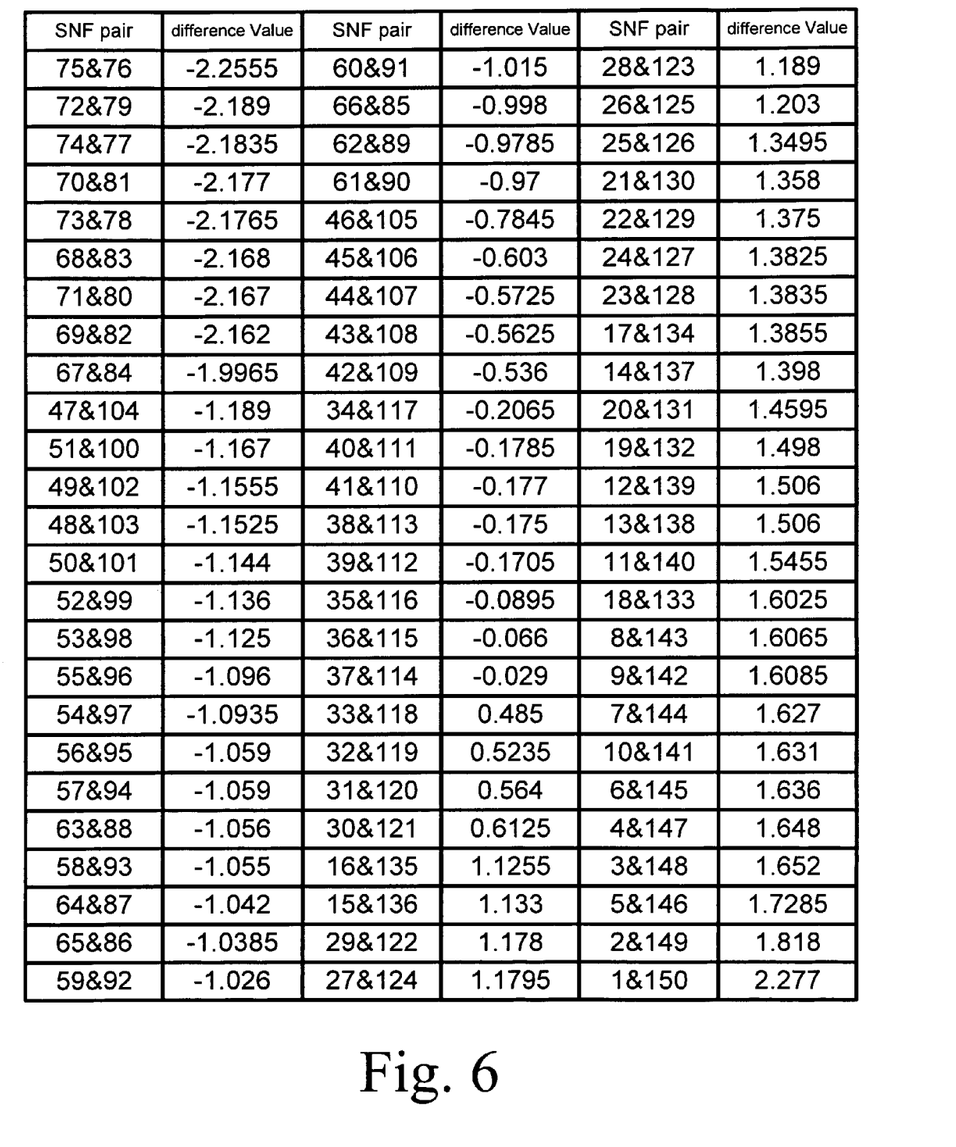

Referring to FIG. 6, there is shown another table of the 75 spent nuclear fuel bundle pairs arranged in the order shown in FIG. 5 and their differences from the mean value of decay heat of the 150 spent nuclear fuel bundles. This table is provided at 18.

Figure 7:
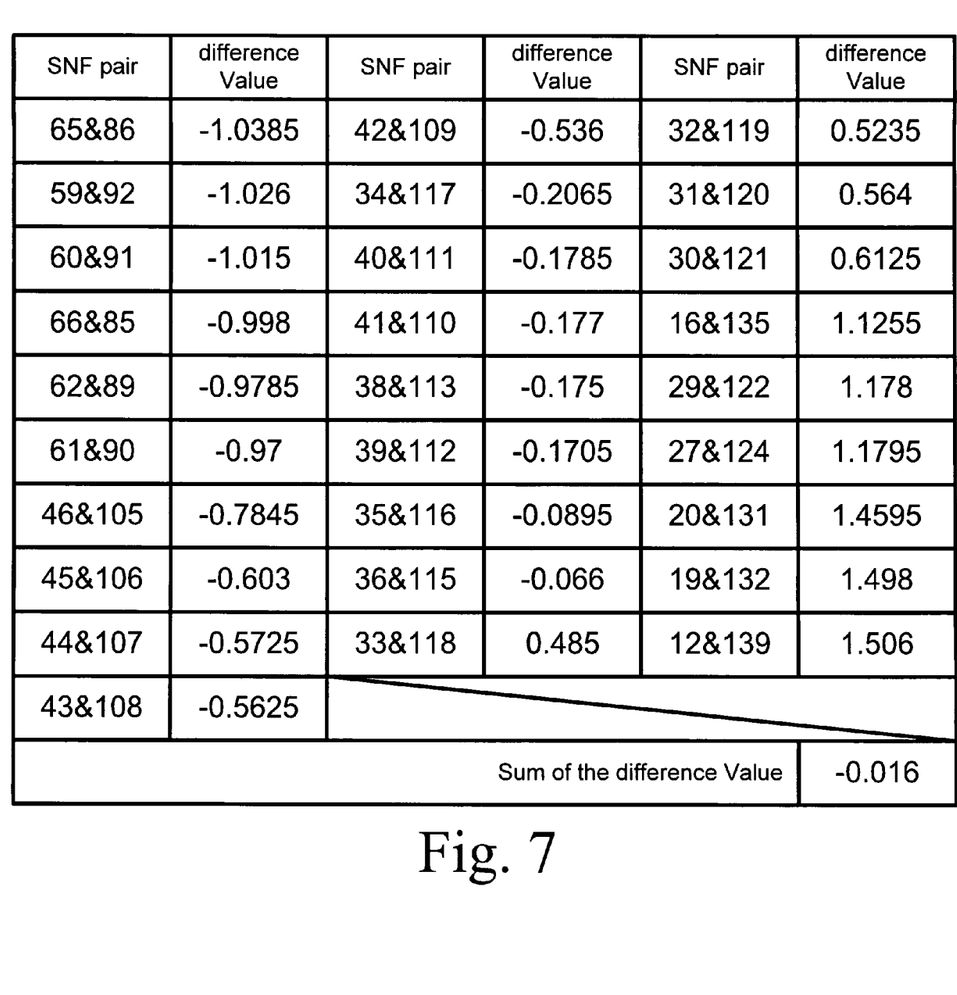
FIG. 7 is a table of spent nuclear fuel bundle pairs for a first cask.

Referring to FIG. 7, there is shown a table of 28 spent nuclear fuel bundle pairs for the first cask. This table is provided at 192.

Figure 8:
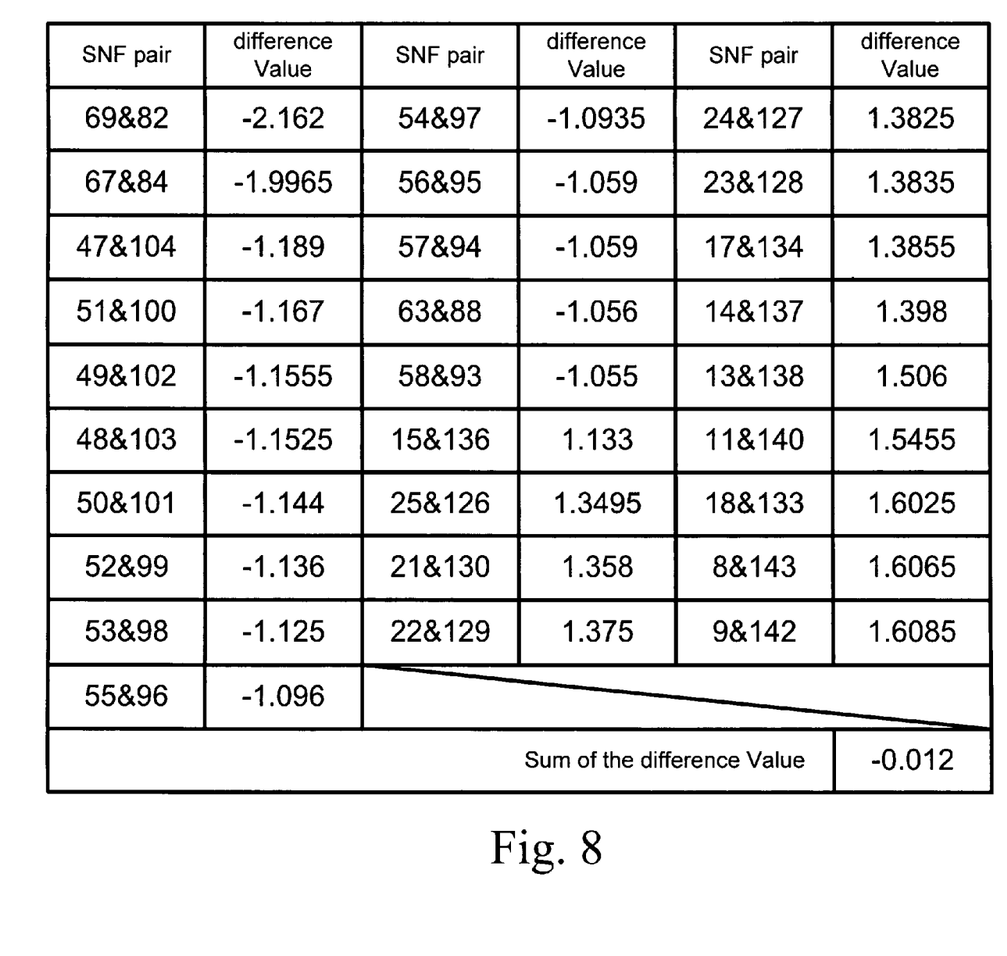
FIG. 8 is a table of spent nuclear fuel bundle pairs for a second cask.

Referring to FIG. 8, there is shown a table of another 28 spent nuclear fuel bundle pairs for the second cask. This table is provided at 192.

Figure 9:
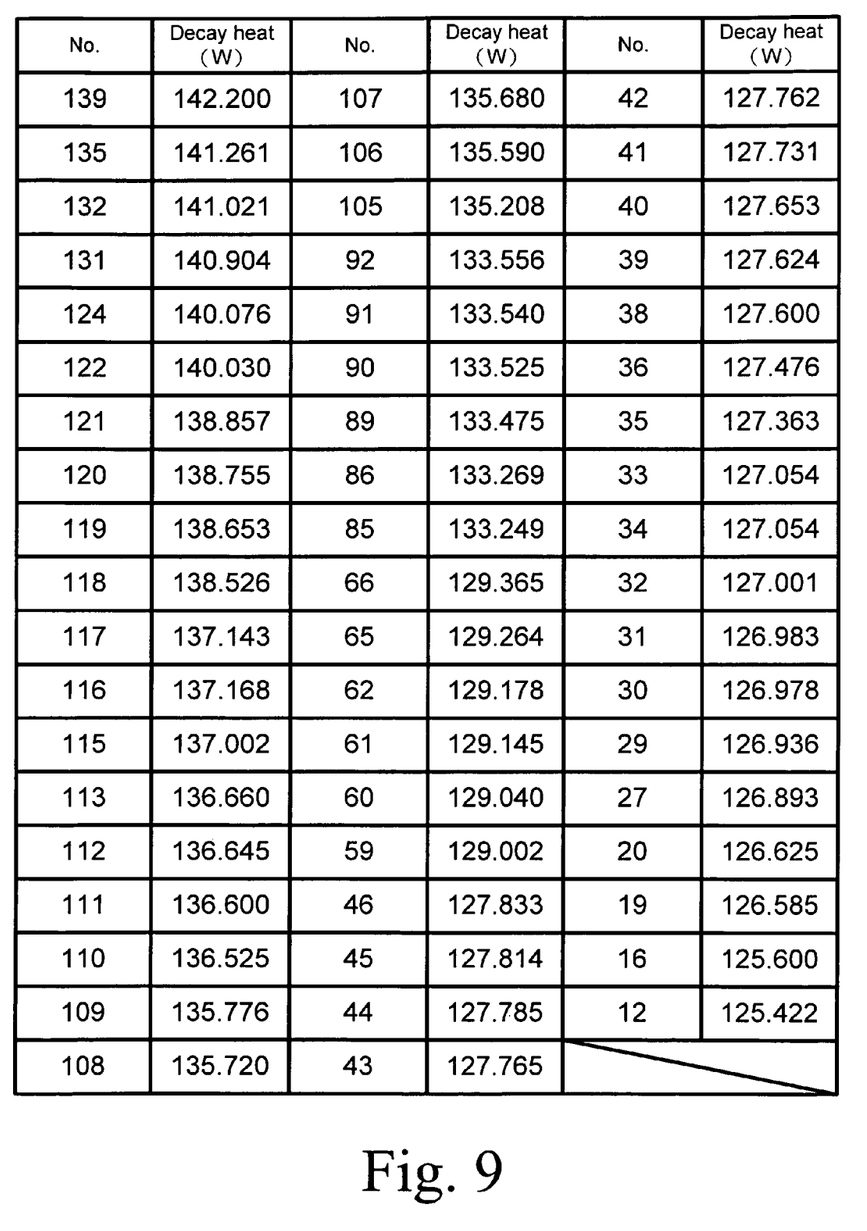
FIG. 9 is a table of the spent nuclear fuel bundles for the first cask.

Referring to FIG. 9, there is shown a table of the 56 spent nuclear fuel bundles for the first cask. This table is provided at 21.

Figure 10:
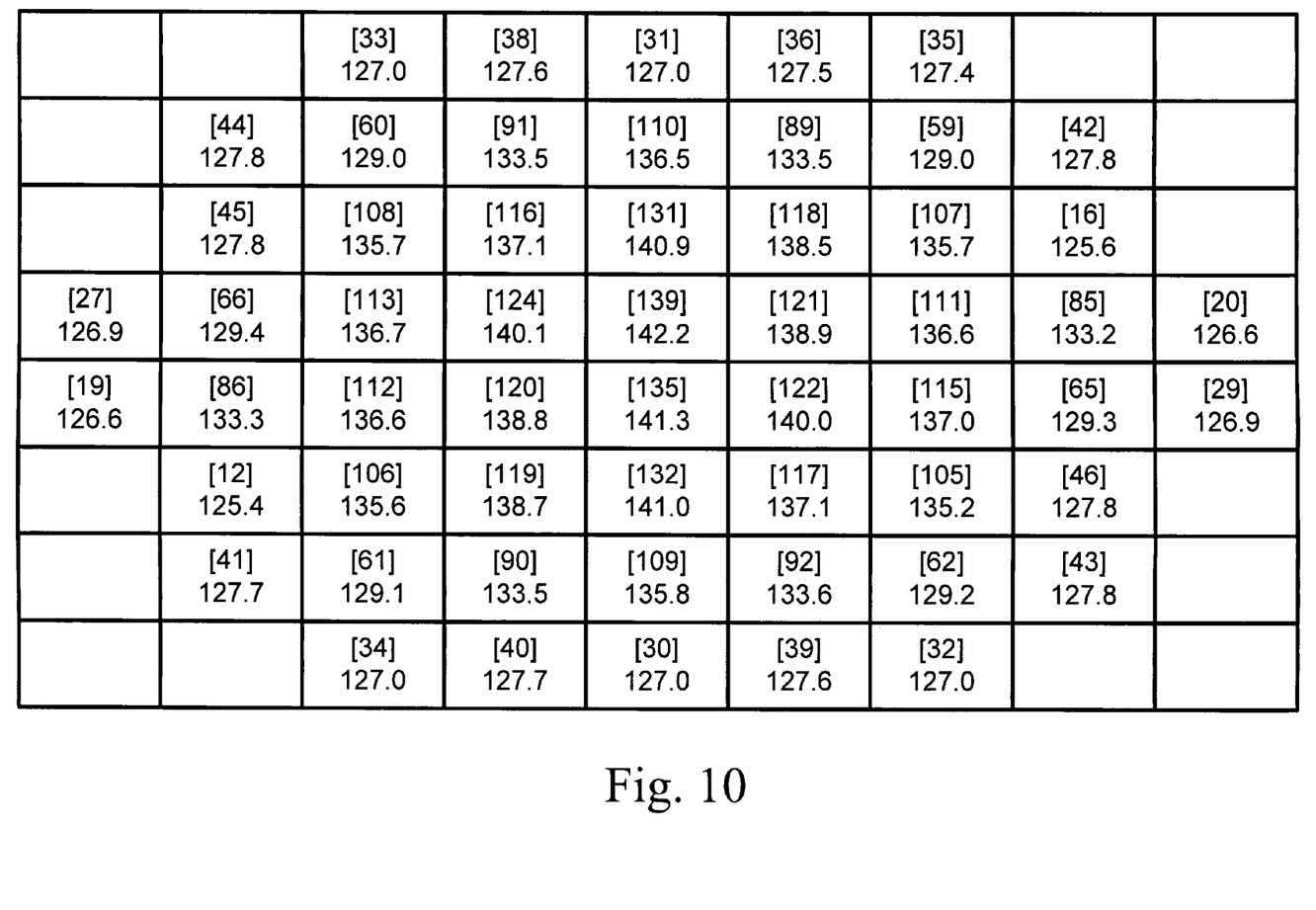
FIG. 10 is a top view of the spent nuclear fuel bundles in the first cask.
Figure 11:
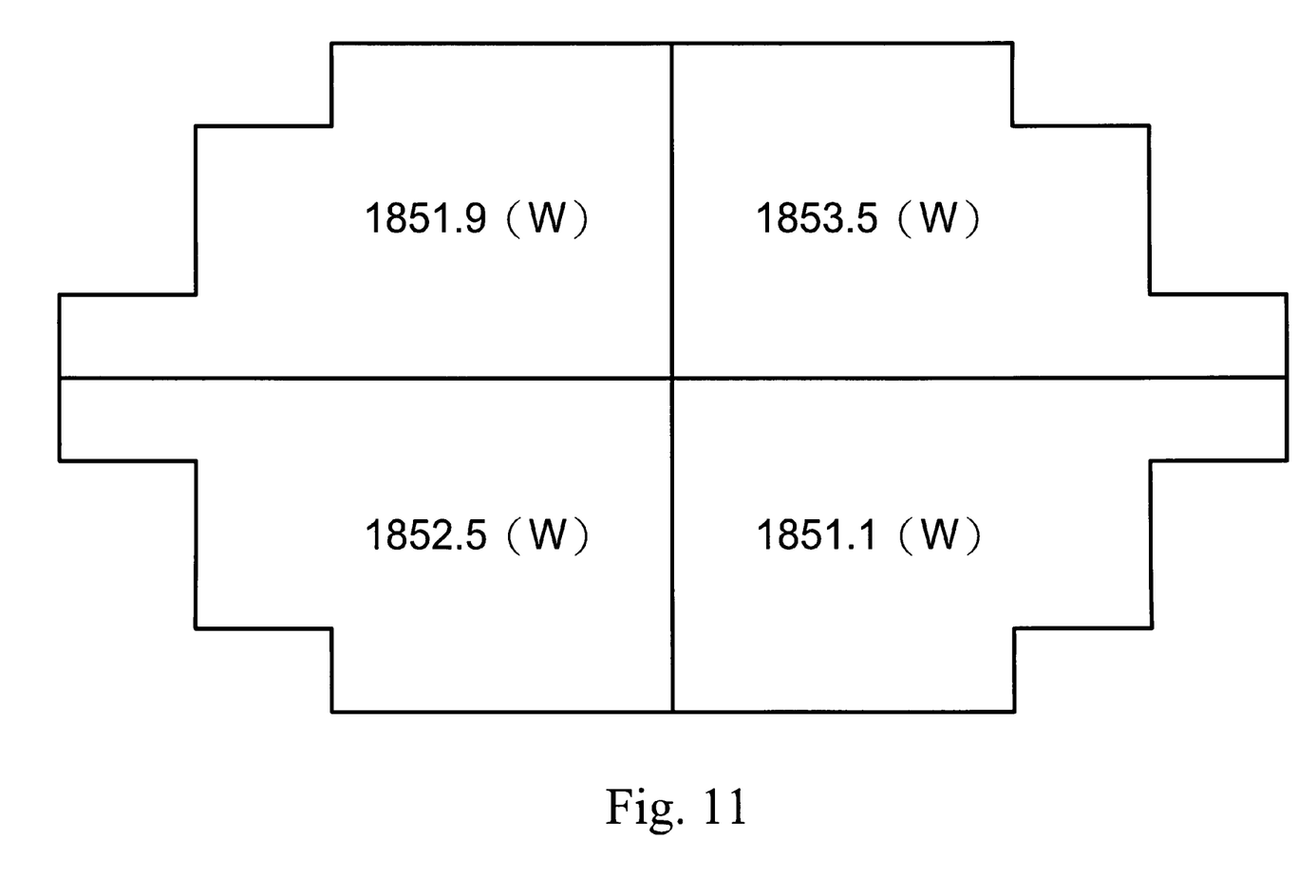
FIG. 11 shows four quadrants of the first cask shown in FIG. 10.

Referring to FIG. 10, at 22, the 56 spent nuclear fuel bundles are disposed in the first cask. Referring to FIG. 11, the heat load on each quadrant is like the heat load on any other quadrant.

The spent nuclear fuel bundles are selected and configured in the casks as low as reasonably achievable regarding the heat load.

The present invention has been described via the detailed illustration of the preferred embodiment. Those skilled in the art can derive variations from the preferred embodiment without departing from the scope of the present invention. Therefore, the preferred embodiment shall not limit the scope of the present invention defined in the claims.

The invention claimed is:

1. A method for selecting and disposing remaining spent nuclear fuel bundles for casks comprising the steps of:
    numbering spent nuclear fuel bundles in order based on their values of decay heat so that the spent nuclear fuel bundles with lower values of decay heat are given smaller numbers;
    removing any spent nuclear fuel bundles with values of decay heat higher than a limit of decay heat for the casks to define remaining spent nuclear fuel bundles;
    calculating the mean value of decay heat of the remaining spent nuclear fuel bundles;
    evaluating one or more casks, wherein each cask comprises a number of cells to hold the remaining nuclear fuel bundles and determining if the number of cells of each cask is odd or even;
    reserving a number of the remaining spent nuclear fuel bundles with values of decay heat closest to the calculated mean value of decay heat of the remaining spent nuclear fuel bundles so that the number of reserved remaining spent nuclear fuel bundles is equal to the number of the casks and to redefine the remaining spent nuclear fuel bundles, when the number of the cells of each cask is odd;
    determining if the number of the remaining spent nuclear fuel bundles is odd or even;
    removing the remaining spent nuclear fuel bundle with the highest value of decay heat and redefining the remaining spent nuclear fuel bundles, when the number of the remaining spent nuclear fuel bundles is odd;
    matching the remaining spent nuclear fuel bundles so that the remaining spent nuclear fuel bundle with the highest value of decay heat is matched with the remaining spent nuclear fuel bundle with the lowest value decay heat, and that the remaining spent nuclear fuel bundle with the second highest value of decay heat is matched with the remaining spent nuclear fuel bundle with the second lowest value of decay heat, and that the remaining spent nuclear fuel bundle with the third highest value of decay heat is matched with the remaining spent nuclear fuel bundle with the third lowest value of decay heat, and so on so as to match the remaining spent nuclear fuel bundles in pairs;

calculating a mean value of decay heat of each remaining spent nuclear fuel bundle pair;

arranging the remaining spent nuclear fuel bundle pairs in order based on their mean value of decay heat;

calculating the difference between the mean value of decay heat of each remaining spent nuclear fuel bundle pair and the previously calculated mean value of decay heat of the remaining spent nuclear fuel bundles;

determining if the number of the cells of each cask is odd or even;

if the number of the cells of each cask is odd, disposing the remaining spent nuclear fuel bundles in the casks in a first way;

if the number of the cells of each cask is even; disposing the remaining spent nuclear fuel bundles in the casks in a second way; and determining if the heat load on each cask is smaller than a limit of heat load and reducing the limit of decay heat for the casks and returning to the step of removing any remaining spent nuclear fuel bundles with values of decay heat higher than the limit of decay heat for the casks, when the heat load on each cask is not smaller than the limit of heat load for the casks.

2. The method according to claim 1, wherein the first way of selecting the remaining spent nuclear fuel bundles comprises the steps of:

disposing each reserved spent fuel bundle in a related cask;

calculating the difference between the value of decay heat of each reserved spent nuclear bundle and the mean value of decay heat of the remaining spent nuclear fuel bundles; and subtracting 1 from the number of the cells of each cask before dividing it by 2, thus providing the number of the spent nuclear fuel bundle pairs for each cask so that the total of the difference between the mean value of decay heat of each selected spent nuclear fuel bundle pair and the mean value of decay heat of the remaining spent nuclear fuel bundles plus the difference between the value of decay heat of the only reserved spent nuclear fuel bundle and the mean value of decay heat of the remaining spent nuclear spent nuclear fuel bundles is close to zero.

3. The method according to claim 1, wherein the second way of selecting the remaining spent nuclear fuel bundles comprises the step of dividing the number of the cells of each cask by 2, thus providing the number of the remaining fuel bundle pairs for each cask so that the total of the difference between the mean value of decay heat of each selected spent nuclear fuel bundle pair and the mean value of decay heat of the remaining spent nuclear fuel bundles is close to zero.

4. The method according to claim 1, wherein disposing the remaining spent nuclear fuel bundles in the casks in the first or in the second way comprises the steps of:

arranging the remaining spent nuclear fuel bundles for each cask in order based on their values of decay heat; and disposing the remaining spent nuclear fuel bundles in each cask so that the remaining spent nuclear fuel bundles with higher values of decay heat are located closer to each center of the cask.

5. The method according to claim 4, wherein the value of decay heat of each remaining spent nuclear fuel bundle is closest to the value of decay heat of another remaining spent nuclear fuel bundle at a same distance to the center of each cask in a diagonal line.

6. The method according to claim 5, wherein the sum of decay heat of the remaining spent nuclear fuel bundles in each quadrant of each cask is close to the sum of decay heat of the remaining spent nuclear fuel bundles in any other quadrant of each cask.

* * * * *